(12) United States Patent
Strange

(10) Patent No.: US 11,040,474 B2
(45) Date of Patent: Jun. 22, 2021

(54) MULTI-LAYER POLYMERIC PROTECTIVE SHEETS USEFUL FOR THREE-DIMENSIONAL DISPLAY SURFACES

(71) Applicant: entrotech, inc., Columbus, OH (US)

(72) Inventor: Andrew C. Strange, Worthington, OH (US)

(73) Assignee: entrotech, inc., Columbus, OH (US)

( * ) Notice: Subject to any disclaimer, the term of this patent is extended or adjusted under 35 U.S.C. 154(b) by 12 days.

(21) Appl. No.: 16/476,781

(22) PCT Filed: Jan. 12, 2018

(86) PCT No.: PCT/US2018/013416
§ 371 (c)(1),
(2) Date: Jul. 9, 2019

(87) PCT Pub. No.: WO2018/132624
PCT Pub. Date: Jul. 19, 2018

(65) Prior Publication Data
US 2019/0358880 A1  Nov. 28, 2019

Related U.S. Application Data

(60) Provisional application No. 62/445,750, filed on Jan. 13, 2017.

(51) Int. Cl.
| | |
|---|---|
| *B29C 48/16* | (2019.01) |
| *B29C 64/336* | (2017.01) |
| *B65B 63/02* | (2006.01) |
| *B29C 64/295* | (2017.01) |
| *B29C 64/118* | (2017.01) |

(52) U.S. Cl.
CPC ............. *B29C 48/16* (2019.02); *B65B 63/02* (2013.01); *B29C 64/118* (2017.08); *B29C 64/295* (2017.08); *B29C 64/336* (2017.08); *B32B 2457/208* (2013.01); *Y10T 428/28* (2015.01)

(58) Field of Classification Search
CPC ..... B29C 48/16; B29C 64/118; B29C 64/295; B29C 64/336; B65B 3/02; Y10T 428/14; Y10T 428/28; B32B 2457/208
See application file for complete search history.

(56) References Cited

U.S. PATENT DOCUMENTS

| | | | |
|---|---|---|---|
| 8,545,959 B2 | 10/2013 | McGuire, Jr. et al. | |
| 2001/0019182 A1 | 9/2001 | Hebrink et al. | |
| 2007/0100060 A1 | 5/2007 | Tahri et al. | |
| 2007/0176309 A1 | 8/2007 | Kanbayashi | |
| 2009/0056280 A1 | 3/2009 | Youell et al. | |
| 2011/0111240 A1 | 5/2011 | Yuan et al. | |
| 2013/0078460 A1 | 3/2013 | Tasaka et al. | |
| 2015/0376304 A1 | 12/2015 | Mrozek et al. | |

FOREIGN PATENT DOCUMENTS

WO  WO-2018/45353  3/2018

*Primary Examiner* — Patricia L. Nordmeyer
(74) *Attorney, Agent, or Firm* — The Griffith Law Firm, A P.C.; Lisa M. Griffith

(57) ABSTRACT

Multi-layer protective sheets of the invention are both rigid enough to provide desired protective properties, but flexible enough to be formable into a desired non-planar shape in order to protect surfaces such as optical display surfaces of electronic devices. Once formed into the desired non-planar shape, a modified interlayer of the multi-layer protective sheet has a shear storage modulus of greater than about 100 MPa.

40 Claims, 5 Drawing Sheets

MULTI-LAYER POLYMERIC PROTECTIVE SHEETS USEFUL FOR THREE-DIMENSIONAL DISPLAY SURFACES

CROSS-REFERENCE TO RELATED APPLICATIONS

This application claims priority from U.S. Provisional Patent Application No. 62/445,750, filed on Jan. 13, 2017, which is incorporated by reference herein in its entirety.

BACKGROUND OF THE INVENTION

Multi-layer polymeric protective sheets of the invention comprise multiple polymeric films. Polymeric films are applied to surfaces of articles for a number of reasons. One significant application for polymeric films is for providing a protective covering on an article's surface. For example, certain polymeric films are capable of protecting an article's surface from damage during use of the article. Such protective polymeric films are often adhered to an article's surface to minimize damage thereto.

Applications for protective and other polymeric films are becoming increasingly desirable as widespread use of consumer electronic devices soars. Many consumer electronic devices employ a display screen that can easily be scratched, cracked, or otherwise damaged. For example, most personal data assistants, cellular phones, tablet computers, laptop computers, notebook computers, and similar devices include a display screen for viewing data and/or images thereon. In order to optimize viewing efficiency, such display screens are highly engineered to maximize clarity of data and images viewed thereon. Unfortunately, however, such display screens are often prone to scratching, cracking, or other types of damage, especially as users of such electronic devices tote the devices haphazardly through their daily lives.

Conventionally, when protective polymeric films are applied to surfaces of electronic devices, the goal is to provide a protective covering on the display or other surface of the device that does not significantly diminish desired qualities of the underlying surface. Importantly, when a protective polymeric film is applied to an optical display screen, the film is selected to have desired optical clarity. Then, when the polymeric film is applied to the optical display screen, it is important to maintain desired optical clarity of the film as well as views of the display screen therethrough.

External glass sheets are gaining popularity for adherence to such display screens. For example, tempered glass screen protector sheets provide a more natural feel when operating a touch-sensitive display screen (also referred to herein as a touchscreen display) therethrough. Some commercially available glass screen protector sheets include a layer of tempered glass within a multi-layer assembly. INVISIBLESHIELD GLASS screen protectors available from Zaag, Inc. (Salt Lake City, Utah) and TECH ARMOR BALLISTIC GLASS and TECH ARMOR EDGE TO EDGE BALLISTIC GLASS screen protectors available from Tech Armor (Redondo Beach, Calif.) are just a few examples.

A shortcoming of commercially available glass sheets, however, is that they have a tendency to provide false implied promises of adequate protection of the underlying display screen. It is often not until the display screen on an electronic device fitted with a glass sheet breaks when dropped that consumers recognize the shortfalls of such "protective" sheets.

Further, although the feel of glass sheets appeals to consumers, application of glass sheets to display screens can be challenging in that the nature of glass material and the thicknesses in which sheets of glass are applied for screen protection does not afford the degree of flexural integrity associated with polymeric films conventionally used for protection of display screens—e.g., the original INVISIBLESHIELD screen protector available from Zaag, Inc. (Salt Lake City, Utah). The lack of flexural integrity of glass sheets makes it difficult to re-apply such a screen protector when it becomes misaligned during, for example, initial installation of the same.

In addition, with the gaining popularity of three-dimensional display surfaces, flexural integrity is of increasing importance so as to permit adequate and durable adherence of screen protectors to non-planar display surfaces—e.g., those smartphone displays with curved edges, such as is the case with the GALAXY S6 EDGE, GALAXY S7 EDGE, and similar smartphones sold by Samsung Electronics Co. (Korea). As compared to application of screen protectors to planar surfaces, where pressure sensitive adhesives often provide adequate and durable adherence, conventional screen protectors applied to non-planar surfaces are prone to edge lift due to spring back and other undesirable properties. While films with decreased thickness and/or that are formed from materials having a lower shear storage modulus are able to adequately adhere to surfaces with relatively simple curves, such films are generally deficient in providing the level of protection desired.

It is generally believed that more rigid films offer more protective properties when applied to a surface. Rigidity or stiffness of a film is a function of the shear storage modulus of the film material and the moment of inertia of the film—i.e., stiffness equals shear storage modulus times moment of inertia. In general, the moment of inertia of a film, I, equals $\frac{1}{12}$ the value of the base dimension times thickness of the film cubed—i.e., I=$\frac{1}{12}$(base times thickness)$^3$. As thickness of a film increases, its stiffness increases non-linearly due to the cubic nature of the associated function. Relative stiffnesses of monolithic films (i.e., single layer films) having thicknesses of 2 mils, 5 mils, and 10 mils are, thus, 8, 125, and 1,000.

As can be appreciated, when thickness of monolithic films is increased to provide a more rigid (and protective) screen protector, thickness of such films and the resulting increase in shear storage modulus of those films generally renders the films deficient in regard to their ability to adequately and durably adhere to many non-planar display surfaces due to their inability to be formed into and maintain the shape of the non-planar surface. More rigid films generally store significant energy as they are bent, such as when the films are applied to a curved display surface. Especially with time, this significant stored energy counters any adhesive force imparted by an adhesive used for the purpose of adhering the film to the surface. When the surface comprises a low surface energy material, as is often the case, the inadequate adherence of such films on non-planar display surfaces is generally more pronounced.

It is desirable to provide alternative assemblies and methods for application of multi-layer polymeric protective sheets to surfaces of articles, particularly three-dimensional surfaces, such as touchscreen displays on electronic devices. Particularly desirable are alternative screen protector assemblies having not only glass-like properties, but also adequate flexural integrity for durable adherence of the sheets to non-planar display surfaces.

BRIEF SUMMARY OF THE INVENTION

The problem of obtaining a protective sheet that is both rigid enough to provide desired protective properties, but flexible enough to be formable into a desired non-planar shape in order to protect non-planar (i.e., three-dimensional) display surfaces, for example, is solved according to the present invention by utilizing a modifiable interlayer within protective sheets of the invention. Once formed into the desired non-planar shape, a modified interlayer of the multi-layer protective sheet has a shear storage modulus (also known to those of ordinary skill in the art as G') of greater than about 100 MPa.

DETAILED DESCRIPTION OF THE INVENTION

The present invention facilitates formation of a relatively thick, relatively flexible multi-layer protective sheet into a non-planar shape and then, while still in the desired shape, conversion of the relatively flexible protective sheet into a relatively rigid protective sheet. Multi-layer protective sheets of the invention are any suitable thickness to provide desired properties.

For protective properties, thicker protective sheets are generally desirable. For example, a protective sheet can have a thickness of up to about 2.5 mm or more. When used in conjunction with consumer electronic devices, protective sheets of the invention having a total thickness of about 0.15 mm to about 0.6 mm are particularly desirable. However, it is to be understood that protective sheets of the invention may be thinner or thicker in certain embodiments.

Formability of thicker protective sheets generally undesirably decreases, however, in conventional multi-layer protective sheets. Unlike conventional multi-layer protective sheets, however, relatively thick multi-layer protective sheets of the invention are formable. As used herein, "formable" refers to a protective sheet's ability to be shaped into and maintained in a non-planar (e.g., curved) form without plastically deforming the outermost layer or layers of the sheet. "Plastic deformation" and the act of "plastically deforming" as used herein is understood to refer to irreversible deformation where the material has been strained past its yield point as understood by those of ordinary skill in the art.

Figure 1A:
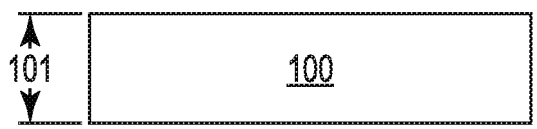
FIG. 1A is a cross-sectional representation of a prior art monolithic film.

It is to be understood that, in contrast to formable protective sheets of the invention, planar monolithic films having an equivalent thickness to that of multi-layer protective sheets of the invention, wherein the same material as used in the monolithic film is used for the relatively thin, rigid individual layers therein, would generally require plastic deformation in order to take the shape of and maintain a non-planar form. An example of a monolithic film 100 having an equivalent thickness 101 to that of a multi-layer protective sheet 102 is illustrated by a comparison FIG. 1A in relation to FIG. 1B. Undesirably, after such a monolithic film is removed from a tool used to shape the non-planar form, the plastic deformation therein can lead to undesirable spring back of the monolithic film toward its planar shape and edge lift of the film from a non-planar surface on which it may be applied.

Figure 1B:
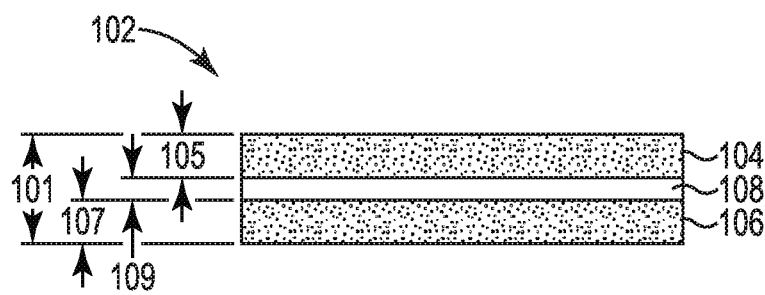
FIG. 1B is a cross-sectional representation of a multi-layer protective sheet of the invention having the same thickness of the monolithic film illustrated in FIG. 1A.

According to one aspect of the invention, protective sheets of the invention are made formable by using multiple layers of relatively thin, rigid polymeric material laminated together with an interlayer capable of exhibiting a relatively low shear storage modulus during shaping (also referred to herein as "forming" and the like) of the multi-layer protective sheet (i.e., laminate) into a desired non-planar form. An example of a multi-layer protective sheet 102 is illustrated in FIG. 1B to include a first layer 104 having a first thickness 105 laminated to a second layer 106 having a second thickness 107 with a modifiable interlayer 108 having a certain thickness 109 therebetween. By "relatively low shear storage modulus," it is to be understood that the shear storage modulus is lower relative to the shear storage modulus of that same interlayer after it is shaped into a non-planar form and ready for use as a multi-layer protective sheet according to the invention.

Many commercially available films can be suitably used as the relatively thin, rigid layers according to the invention, including those based on polymethylmethacrylate (PMMA), polyethylene terephthalate (PET), and polycarbonate chemistries, for example. PMMA films are commercially available, for example, from Evonik Industries AG (Darmstadt, Germany) under the trade designations, PLEXIGLAS and ACRYLITE; from DuPont under the trade designation, LUCITE; and from Altuglas International, a subsidiary of Arkema Inc. (King of Prussia, Pa.), under the ALTUGLAS, OROGLAS, and PLEXIGLAS trade designations. Biaxially-oriented PET films are commercially available under, for example, the MYLAR trade designation from DuPont Teijin Films U.S. Limited Partnership (Chester, Va.). Polycarbonate films are commercially available, for example, from Saudi Basic Industries Corporation (SABIC) (Pittsfield, Mass.) under the LEXAN trade designation and Covestro LLC (Pittsburgh, Pa.) under the MAKROLON trade designation.

Interlayers of the invention differ from conventional laminating materials. The use of conventional laminating material for bonding within a conventional multi-layer protective sheet typically allows for transmission of shear stresses between layers, resulting in an increased overall stiffness of the construction. However, conventional laminating material used to form a stiffer protective sheet results in an article that is not sufficiently formable into a desired non-planar shape due to its relative rigidity and associated lack of shear deformability.

Although relatively thin, rigid layers without any laminating or bonding material therebetween can, in multiples, provide a desired protective sheet thickness and are more formable than conventional laminates that would otherwise be formed from the same relatively thin, rigid layers and conventional laminating material, the resulting protective sheets typically do not possess the desired overall stiffness normally associated with a monolithic film of the same material as that of the relatively thin, rigid layers and having the same thickness as such an unbonded multi-layer protective sheet. Again, rigidity or stiffness of a monolithic film is a function of the moment of inertia of the film, which moment of inertia is a cubic function of a film's thickness.

While relative stiffnesses of monolithic films having thicknesses of 2 mils, 5 mils, and 10 mils are 8, 125, and 1,000, stiffness of a multi-layer sheet is reduced when it comprises an unbonded stack of thinner layers. For example, while a 10 mil-thick monolithic film has a relative stiffness of 1,000, the relative stiffness of a 10 mil-thick stack of five layers, each layer having a thickness of 2 mils (individually which layers have a relative stiffness of 8) is 40. As another example, the relative stiffness of a 10 mil-thick stack of 2 layers, each layer having a thickness of 5 mils (individually which layers have a relative stiffness of 125) is 250.

Thus, relatively thin individual layers within a multi-layer protective sheet are typically bonded in order to form an overall protective sheet of the desired stiffness. Given that protective sheets of the invention include multiple layers that are bonded with interlayer material that is modifiable, the problem of how to obtain sufficient stiffness in the resulting protective sheet, without compromising formability of the protective sheet into non-planar shapes, is overcome as described herein.

"Modifiable" refers to material capable of exhibiting a relatively low shear storage modulus—i.e., it is viscoelastic—during shaping of the multi-layer protective sheet into a desired non-planar form. Any suitable modifiable material can be used as interlayers of the invention, with the material being selected according to the intended method for modification of the modifiable interlayer. Chemistry of modifiable interlayers of the invention is selected according to knowledge of those of ordinary skill in the art having an understanding as to the intended method for modifying the same.

Depending on how the material is modified, the interlayer can be modified reversibly or irreversibly, as described further below. The modifiable material is shear-deformable under the desired forming conditions.

Shear deformability of the interlayer therein allows protective sheets of the invention to be more easily formable into a desired non-planar shape and to also possess sufficient stiffness needed to provide desired protective properties after their formation and adherence to a non-planar surface. If needed, the interlayer is first modified so that it becomes a "formable interlayer," exhibiting a relatively low shear storage modulus during shaping of the multi-layer protective sheet into a desired non-planar form. In the case of reversible modification, the modifiable interlayer may have been first modified to decrease its shear storage modulus, for example, and then modified to increase its shear storage modulus to its original state. Many interlayers, however, exhibit a relatively low shear storage modulus initially under ambient conditions and do not require this initial modification to become a "formable interlayer." In any event, after formation into the desired shape, the interlayer is modified to increase its shear storage modulus and facilitate maintenance of the non-planar shape.

Thus, as used herein, "modifiable interlayer" is understood to refer to the ability to modify the shear storage modulus of the interlayer, as necessary, such that it exhibits a relatively low shear storage modulus during shaping of the multi-layer protective sheet into a desired non-planar form and then maintains that non-planar form, preferably in a durable (i.e., long-lasting) manner. As used herein, "modified interlayer" is understood to refer to a modifiable interlayer that has been modified so that it is no longer shear-deformable.

According to one aspect of this embodiment, the interlayer has a shear storage modulus of less than about 100 MPa, preferably less than about 50 MPa, and more preferably less than about 25 MPa under the desired forming conditions—i.e., during shaping of the multi-layer protective sheet into a desired non-planar form. According to another aspect of this embodiment, the interlayer has a tan delta greater than about 0.5, preferably greater than about 0.75, and more preferably greater than about 1.0 under the desired forming conditions. Shear storage modulus and tan delta of the interlayer can be measured using a rheometer available from TA Instruments (New Castle, Del.) under the trade designation, Discovery HR-2. Testing is performed on the rheometer in oscillation mode using 25-millimeter parallel plates and a thickness of 200 microns at a frequency of 1 Hz, a strain of 0.03%, and a ramp rate of 3° C./minute. Such testing facilitates determination of storage modulus and tan delta values for a sample.

According to another aspect of this embodiment, the interlayer has a shear storage modulus of greater than about 100 MPa, preferably greater than about 500 MPa, and more preferably greater than about 1,000 MPa once modified and at the temperature at which it is to be used. According to another aspect of this embodiment, the interlayer has a tan delta less than about 0.5, preferably less than about 0.25, and more preferably less than about 0.1 once modified and at the temperature at which it is to be used. In a preferred embodiment, shear storage modulus of the modified interlayer is at least as great as that of an adjacent polymeric layer.

Depending on the number of relatively thin, rigid layers used in a multi-layer protective sheet of the invention, the number of modifiable interlayers within a protective sheet may vary. At least one modifiable interlayer is present within a protective sheet of the invention. Preferably, a modifiable interlayer is present between each set of adjacent relatively thin, rigid layers within a protective sheet. Thus, a protective sheet formed from three relatively thin, rigid layers preferably contains two modifiable interlayers. A protective sheet formed from five relatively thin, rigid layers preferably contains four modifiable interlayers.

According to one embodiment, an interlayer is chemically modifiable in order to facilitate durable adherence of the protective sheet to a non-planar surface. Chemical modification of an interlayer to achieve a higher shear storage modulus can be accomplished using any suitable method known to those skilled in the art. Exemplary methods for chemical modification include the following curing methods: ultraviolet (UV) irradiation (e.g., resulting in cationic or free radical reactions), thermal irradiation resulting in free radical reaction (e.g., peroxide cure), step growth polymerization, 1K thermoset reactions (i.e., relying on latent curatives), 2K or 2-part thermoset reactions (i.e., relying on active curatives), and B-stage epoxy reactions.

After a multi-layer protective sheet of the invention is shaped into a non-planar form, the interlayer is subsequently modified to have a significantly higher shear storage modulus. In certain embodiments, the modified interlayer has a shear storage modulus that is at least two times, five times, ten times, one-hundred times, or even one-thousand times as high as the shear storage modulus of the modifiable interlayer while shaping of the protective sheet into a non-planar form and before final modification of the interlayer therein.

To modify the interlayer to increase its shear storage modulus according to an exemplary method relying on UV irradiation and resulting in a cationic reaction, a multi-layer protective sheet of the invention is irradiated with UV radiation to initiate cure of the interlayer via a cationic reaction. Cure via a cationic reaction can be initiated before or after shaping the protective sheet into a non-planar form. To shape the sheet, the sheet can then be placed into a forming tool, such as a mandrel, which is open or closed (e.g., a clamshell).

The ability of a volume of material to continue cure after UV initiation, but without any additional UV radiation after initiation is known as dark cure. Not all cationic mechanisms take advantage of dark cure. Many times, the volume of material is essentially completely cured under UV radiation. This invention may take advantage of dark cure, however, in order to minimize the time of UV exposure required. In this manner, a protective sheet formed according to the invention can cure in a packaging (e.g., in the dark) after UV initiation while it is packaged, stored, and/or shipped to a customer or end user of the protective sheet. This can advantageously drastically decrease time between manufacture and sale/use of the protective sheet.

As noted, after initiation, cure occurs over time without requiring application of additional radiation (e.g., UV or thermal radiation), although additional radiation (e.g., thermal radiation) can be used to accelerate cure if desired. If used, any thermal radiation (i.e., heat) is applied at a temperature less than the glass transition temperature of the relatively thin, rigid layers in the resulting protective sheet. In order to preserve the shape of the sheet during cure, tools including molds (a wide variety of which are suitable and may include features such as pins or protrusions to hold the protective sheet in alignment on the mold), clamps, vacuum bagging apparatus (e.g., that described in U.S. Pat. No. 8,545,959, which description of vacuum bagging apparatus and associated methodology is incorporated herein by reference), shrink film, etc. may be used to maintain its non-planar form by application of mechanical force. In an exemplary embodiment, given that application of additional radiation is not necessary for cure to progress to the desired state, once a protective sheet is being held in a desired shape according to this embodiment, it can be packaged, stored, and/or shipped to a customer or end user of the protective sheet while curing the sheet at the same time and maintaining the shape of the formed sheet using such tools as part of the protective sheet product packaging. This can advantageously drastically decrease time between manufacture and sale/use of the protective sheet.

Similarly, to modify the interlayer to increase its shear storage modulus according to an exemplary method relying on UV irradiation and resulting in free radical reaction, a multi-layer protective sheet of the invention is irradiated with UV radiation to initiate and cure the interlayer therein via a free radical reaction. To shape the protective sheet, the sheet can be placed into a forming tool, such as a mandrel, which is open or closed (e.g., a clamshell). Cure via free radical reaction is initiated after shaping the sheet into a non-planar form. In order to preserve the shape of the sheet during cure, tools including molds, clamps, etc. may be used to maintain its non-planar form by application of mechanical force. Cure progresses via continued exposure to UV radiation. Thus, any closed tool used to shape the sheet must transmit the necessary wavelengths of UV light to any portions of the protective sheet requiring curing.

To modify the interlayer to first reversibly decrease its shear storage modulus and then reversibly increase its shear storage modulus according to an exemplary method relying on thermal radiation resulting in free radical reaction, a multi-layer protective sheet of the invention is irradiated with thermal radiation at least prior to or during shaping of the sheet into a non-planar form. To shape the sheet, the sheet can then be placed into a forming tool, such as a mandrel, which is open or closed (e.g., a clamshell).

Figure 2A:
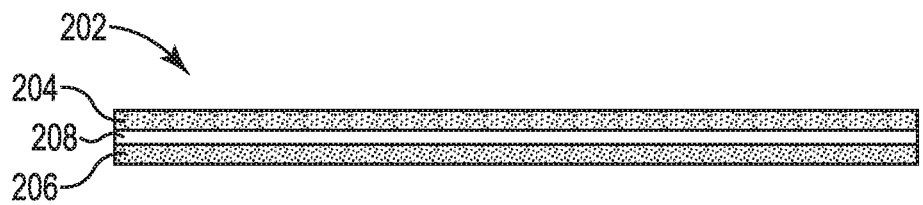
FIG. 2A is cross-sectional representation of a multi-layer protective sheet of the invention having a modifiable interlayer.
Figure 2B:
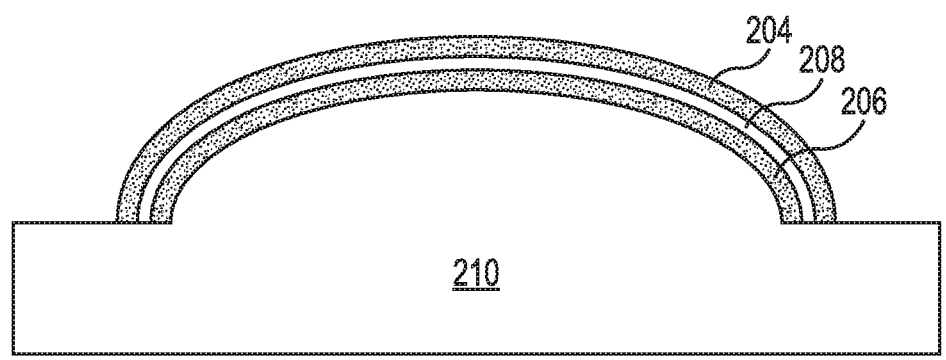
FIG. 2B is a cross-sectional representation of the multi-layer protective sheet of FIG. 2A as it is formed into a non-planar shape using an open clamshell mold.
Figure 2C:
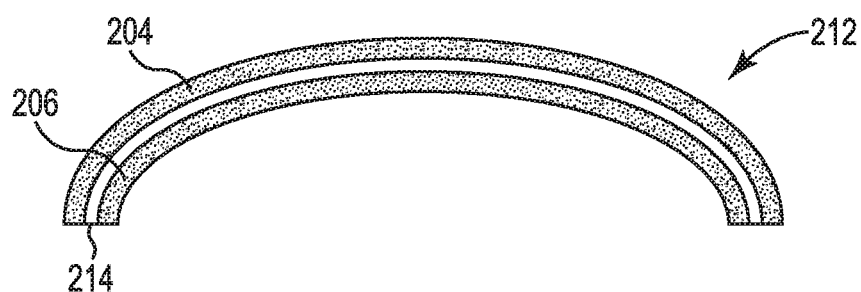
FIG. 2C is a cross-sectional representation of a relatively rigid multi-layer protective sheet formed using the multi-layer protective sheet and mold illustrated in FIG. 2B.
Figure 3A:
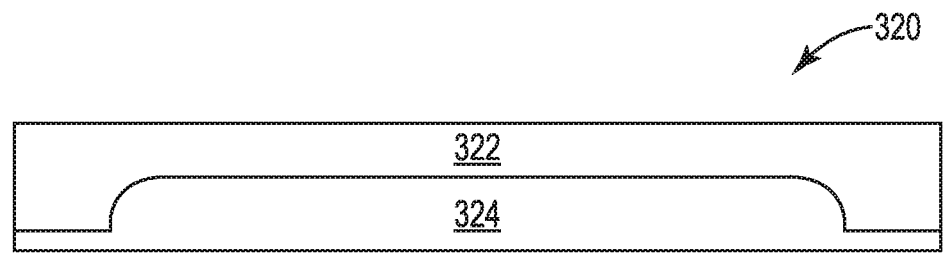
FIG. 3A is cross-sectional representation of a closed clamshell mold useful in forming multi-layer protective sheets of the invention into non-planar shapes.
Figure 3B:
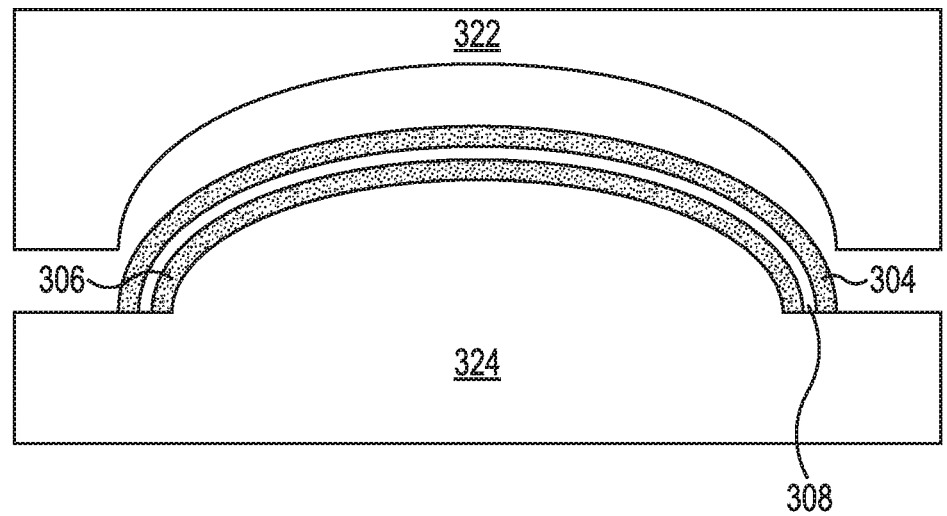
FIG. 3B is a cross sectional representation of a multi-layer protective sheet of the invention as it is formed into a non-planar shape using the closed clamshell mold illustrated in FIG. 3A.
Figure 4A:
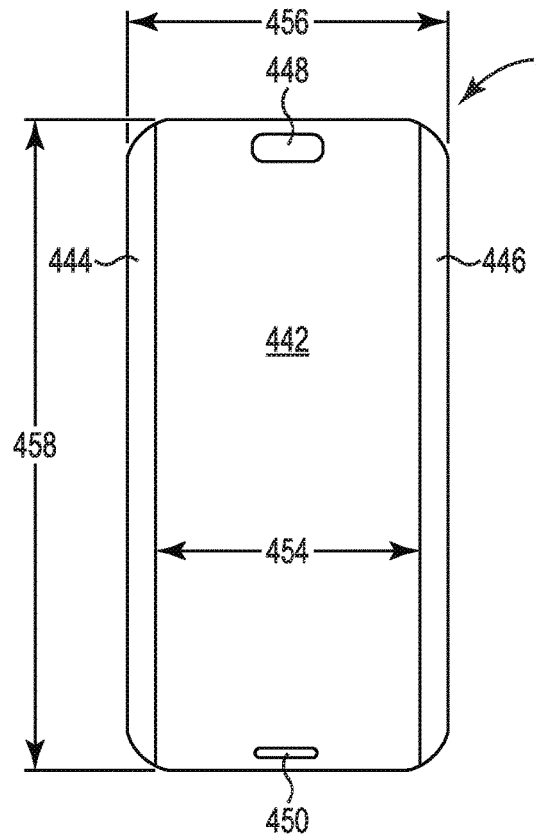
FIG. 4A is a plan view of a multi-layer protective sheet of the invention formed into a non-planar shape corresponding to an electronic display surface of a Samsung GALAXY S7 EDGE smartphone available from Samsung Electronics Co., Ltd. or equivalent.
Figure 4B:
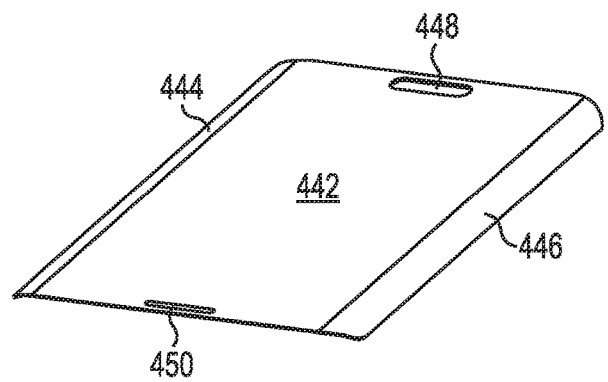
FIG. 4B is a top perspective view of the multi-layer protective sheet illustrated in FIG. 4A.
Figure 4C:
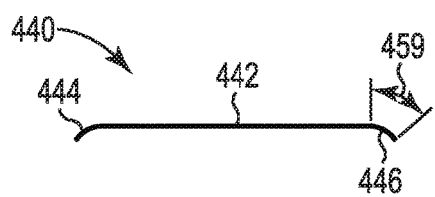
FIG. 4C is a generalized cross-sectional view of the overall multi-layer protective sheet illustrated in FIGS. 4A and 4B.
Figure 4D:
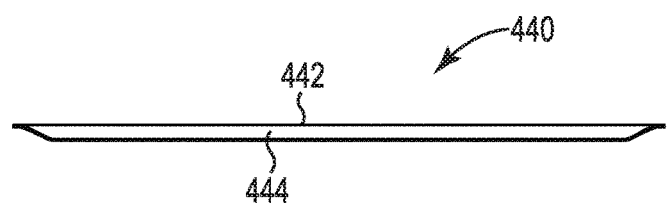
FIG. 4D is a side view of the overall multi-layer protective sheet illustrated in FIGS. 4A and 4B.

Methods for forming multi-layer protective sheets of the invention into a desired non-planar shape are illustrated with reference to FIGS. 2A-2C and FIGS. 3A-3B. In one embodiment, as illustrated in FIG. 2A, a multi-layer protective sheet 202 having a first layer 204 laminated to a second layer 206 with a modifiable interlayer 208 therebetween is provided. As illustrated in FIG. 2B, the multi-layer protective sheet 202 is then formed into a desired non-planar shape using an open clamshell mold 210. The modifiable interlayer 208 is then modified to increase its shear storage modulus. Once removed from the open clamshell mold 210, a relatively rigid multi-layer protective sheet 212 comprising a modified interlayer 214 between the first layer 204 and the second layer 206 results, as illustrated in FIG. 2C. In another embodiment, as illustrated in FIGS. 3A-3B, a multi-layer protective sheet having a first layer 304 laminated to a second layer 306 with a modifiable interlayer 308 therebetween is formed into a desired non-planar shape using a closed clamshell mold 320. The closed clamshell mold 320 comprises a top part 322 and a bottom part 324. When cure is effected via free radical initiation, for example, at least one of the top part 322 and the bottom part 324 is transparent to UV radiation. The modifiable interlayer 308 is modified to increase its shear storage modulus before removing the resulting relatively rigid multi-layer protective sheet (not shown) from at least the bottom part 324 of the closed clamshell mold 320.

Conventionally, as well-known in the art, thermoforming requires the heating of all layers within a laminate to a point where they can be plastically deformed. This often results in degradation of at least one layer within the laminate. In the case of polycarbonate and polyethylene terephthalate, for example, degradation of the material can occur at the temperature (i.e., 160° C.-180° C.) typically necessary to thermoform layers of such material. Evidence of degradation takes many forms, including yellowing or bubbling of the laminate. Within laminates, evidence of degradation is often more pronounced than in monolithic films due to differing material properties of adjacent layers within the laminate (e.g., between relatively thin, rigid layers and adjacent laminating material) that can result in, for example, different degrees of thermal expansion contributing to evidence of degradation.

Advantageously, in contrast to conventional thermoformable laminates and methods, according to the present invention, the shear storage modulus of the modifiable interlayer accordingly to this embodiment is formulated to react to changes in temperature, such that the interlayer is reversibly modified in this embodiment. For example, when heated, the shear storage modulus of the modifiable interlayer decreases. When then cooled, the shear storage modulus of the modifiable interlayer increases.

To shape the sheet into a non-planar form according to one aspect of this embodiment of the invention, the sheet need only be heated to the point at which the modifiable interlayer softens (i.e., as a result of a decrease in the shear storage modulus thereof). Preferably, the modifiable interlayer softens sufficiently to allow shaping of the sheet at a temperature below the lowest thermoforming temperature of any of the individual film layers therein. More preferably, the modifiable interlayer sufficiently softens at a temperature less than about 70%, and even more preferably, at a temperature less than about 50% of the lowest thermoforming temperature of any of the individual relatively thin, rigid layers of the sheet.

In one embodiment, the modifiable interlayer sufficiently softens at a temperature less than about 100° C. In a further embodiment, the modifiable interlayer sufficiently softens at a temperature less than about 75° C. In a still further embodiment, the modifiable interlayer sufficiently softens at a temperature less than about 50° C.

After the protective sheet is shaped into a non-planar form according to this method, the protective sheet is allowed to cool, passively or actively. In a preferred embodiment, the shear storage modulus of the interlayer significantly increases as it returns to around room temperature and/or the usual maximum temperature to which the protective sheet will typically be exposed during use. In an exemplary embodiment, the shear storage modulus of the modifiable interlayer decreases by an order of magnitude over a relatively small temperature drop. In order to preserve the shape of the protective sheet during cure, tools including molds, clamps, etc. may be used to maintain its non-planar form by application of mechanical force.

Multi-layer polymeric protective sheets according to the invention are capable of providing functionality that is understood by one of ordinary skill in the art to be, for example, protective, decorative, reflective, anti-reflective, fog-resistant, and/or for privacy. The protective sheets provide particularly noteworthy benefits when applied to non-planar (i.e., three-dimensional) display surfaces.

In a preferred embodiment, multi-layer protective sheets of the invention advantageously have improved glass-like properties—e.g., a smooth, unobstructed feel when operating a touchscreen display therethrough—as compared to conventional polymeric protective sheets, which feel relatively tacky or rough when moving a finger thereacross. Preferably, the coefficient-of-friction of outwardly exposed surfaces of such protective sheets according to this embodiment of the invention is less than about 0.40, more preferably less than about 0.35, when tested according to ASTM D1894. According to another preferred embodiment, the coefficient-of-friction of outwardly exposed surfaces of such protective sheets of the invention is no more than about 25% greater, more preferably no more than about 20% greater, and even more preferably no more than about 15% greater, than that of an underlying display screen to which the polymeric protective sheet is applied. In one embodiment, the coefficient-of-friction of outwardly exposed surfaces of such protective sheets is less than that of an underlying display screen (e.g., the outermost layer on the iPhone 6 display screen, available from Apple, Inc. (Cupertino, Calif.)) to which the protective sheet may be applied. Any suitable material can be used to form the outwardly exposed surface of such multi-layer protective sheets. An exemplary material is nanomodified with sapphire, such as a thermoset polyacrylic-urethane modified with nanosapphire, an aluminum oxide. Nanosapphire modifiers are commercially available from BYK Additives, a division of BYK-Chemie GmbH. For example, such modifiers are available from BYK Additives under the NANOBYK-3602 and NANOBYK-3610 trade designations.

PCT Patent Application No. PCT/US17/49969, incorporated herein by reference in its entirety, describes further aspects of this preferred embodiment that can be adapted to provide protective sheets of the invention. While multi-layer polymeric protective sheets of this embodiment of the invention may be referred to as "faux glass" or the like, as compared to screen protector assemblies based on tempered glass, however, protective sheets of the invention have improved flexural integrity.

Multi-layer protective sheets of the invention may be applied to at least a portion of one or more surfaces of an article, such as surfaces on which data and/or images are visible (e.g., the surface of an optical display screen). When configured for application to a surface on which data and/or images are to be viewed, a protective sheet of the present invention may be transparent. Protective sheets configured for application to other surfaces, including surfaces through which data and/or images need not be clearly viewed, may be, for example, not only transparent, but also translucent or opaque. In further embodiments, protective sheets of the invention include one or more decorative features that enhance the look of a surface onto which they are to be applied.

In one embodiment, multi-layer protective sheets of the invention can be effectively applied to one or more surfaces of an article, such as an electronic device. The invention is applicable to any of a number of articles, electronic or otherwise, such as, for example, consumer electronic devices. Exemplary embodiments of the invention include those applicable to consumer electronic devices, such as personal data assistants, cellular phones, personal computers (e.g., tablet, laptop, and notebook computers), and similar devices that include a display screen for viewing data and/or images thereon. According to an exemplary embodiment, the consumer electronic device comprises a touchscreen display for control of the device. Such displays are particularly benefited by polymeric protective sheets having glass-like properties. According to other embodiments, polymeric protective sheets of the invention are applied to other types of surfaces that may benefit, aesthetically or otherwise, from a protective covering.

In one embodiment, protective sheets of the invention are formed and sized to approximate the size of a display screen to which they are applied. As used herein, "display screen" is to be understood to include not only portions of a surface through which data and/or images are viewed, but all adjacent portions of that same material surface in further embodiments. According to this embodiment, the protective sheet may be planar or non-planar, the latter case existing when the electronic device has a non-planar display screen (e.g., as is the case with the Samsung GALAXY S6 EDGE, Samsung GALAXY S6 EDGE+, Samsung GALAXY S7 EDGE, Samsung GALAXY S8, and Samsung GALAXY S8+ smartphones available from Samsung Electronics Co., Ltd. and the iPhone 6 available from Apple, Inc. (Cupertino, Calif.)).

FIGS. 4A-4D illustrate a multi-layer protective sheet 440 (for simplicity, illustrated as only one layer) of the invention formed and sized to approximate the size of a display screen for a Samsung GALAXY S7 EDGE available from Samsung Electronics Co., Ltd. Once so formed, the multi-layer protective sheet 440 includes a planar portion 442 with a first curved edge portion 444 and a second curved edge portion 446 on opposite longest sides of the planar portion 442. The planar portion 442 is illustrated to include two cut-out portions, one cut-out corresponding to a movable push button 448 and another cut-out corresponding to a speaker 450. Width 454 of the planar portion 442 is about 60 millimeters, and overall width 456 of the protective sheet 440, including projected planar widths of first curved edge portion 444 and second curved edge portion 446 is about 73 millimeters. Maximum length 458 of the protective sheet 440 is about 148 millimeters. Second curved edge portion 446 is curved with respect to the planar portion 442 to an angle 459 of about 55-degrees. The first curved edge portion 444 is similarly curved.

In another embodiment, protective sheets of the invention are formed and sized (e.g., by laser cutting) to not only cover the display screen to which they are applied, but also such that they are large enough to cover at least a portion of the metal and/or plastic case adjacent the display screen. According to this embodiment, the protective sheet may be planar or non-planar. In an exemplary embodiment, a protective sheet is formed and sized to cover the display screen on a major top surface of the device and extend around the device to a portion of at least one, preferably both opposite, side surfaces of the device. The portion of the side surface of the device covered with a protective sheet is a major portion—i.e., greater than fifty-percent of the surface area on that side surface of the device—in an exemplary embodiment. The portion of the side surface of the device covered with the protective sheet is a full portion—i.e., about one-hundred-percent of the surface area on that side surface of the device—in another exemplary embodiment.

Figure 5:
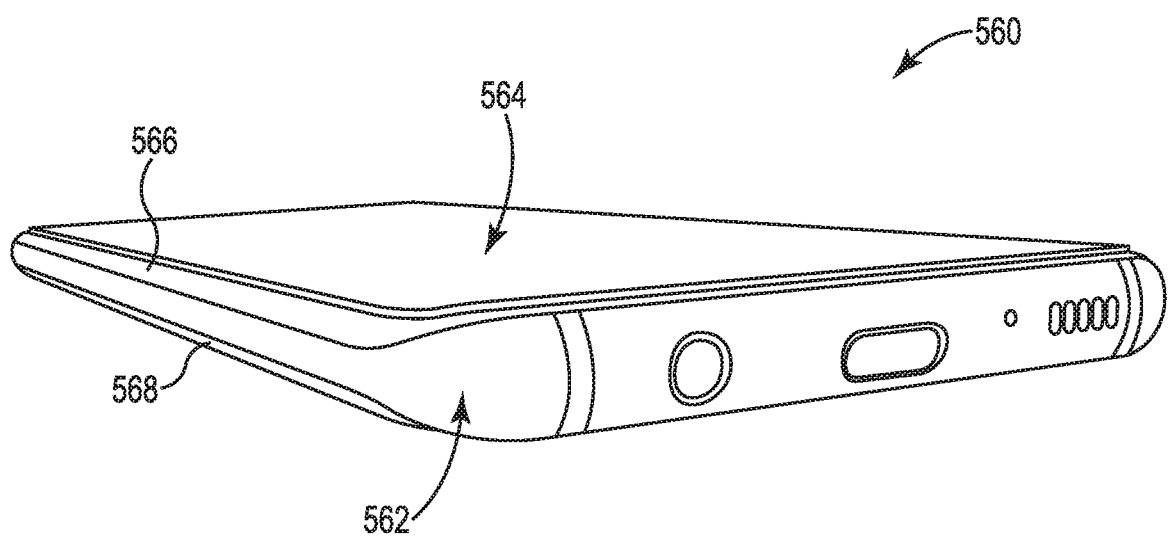
FIG. 5 is a side perspective view of a multi-layer protective sheet of the invention formed into a non-planar shape corresponding to and protecting an underlying optical display screen of a Samsung Galaxy S8 smartphone or equivalent.

FIG. 5 illustrates a multi-layer protective sheet 564 of the invention formed and sized to cover an underlying optical display screen (i.e., INFINITY DISPLAY) of a Samsung GALAXY S8 available from Samsung Electronics Co., Ltd. and represented by reference number 562. The overall electronic article 560, thus, comprises the relatively rigid protective sheet 564 outwardly exposed adjacent to and protecting the underlying optical display screen (not shown). The protective sheet 564 extends to a bumper portion 566 on a side of the smartphone 562 opposite from relatively rugged backside portion 568 of the smartphone 562.

In another embodiment, protective sheets of the invention are formed and sized to cover essentially every outwardly exposed surface of an electronic device—i.e., the display screen and case, except for movable push buttons, speakers, microphones, and the like. According to this embodiment, the protective sheet may be fitted to the electronic device in multiple parts, which parts in their entirety cover essentially every outwardly exposed surface of the electronic device. In one embodiment, the protective sheet is formed into a top and bottom piece, which pieces together fit around the electronic device and abut or otherwise mate so that they cover essentially every outwardly exposed surface of an electronic device as described above.

Due to the number of different shapes and sizes of surfaces on articles that can benefit from protective sheets of the invention, it is desirable to be able to efficiently form protective sheets for application to the varying surfaces. Advantageously, the protective sheets do not include tempered glass layers and are able to be efficiently formed into a desired shape, without sacrificing protective properties, due to the presence of the modifiable interlayer therein.

To assist in adherence of the protective sheet to a desired surface on an article, a layer of self-wetting material can be formed on the surface of the protective sheet to be contacted with the surface of the article. As used herein, "self-wetting" refers to a material having the ability to flow onto a surface relatively quickly and efficiently, typically by virtue of it having a lower surface energy than that of the surface on which it flows, and preferably pushing any bubbles in front of it to avoid trapping any air bubbles between the material and the surface. According to a further preferred embodiment, if bubbles do become entrapped, they are capable of being readily removed by application of light finger pressure in order to move any bubbles to the edge of a layer of the material.

The self-wetting layer comprises any suitable chemistry and thickness. Preferably, the self-wetting layer is a pressure-sensitive adhesive. In an exemplary embodiment, the self-wetting layer comprises silicone. Commercially available silicone pressure-sensitive adhesives are obtainable, for example, from Dow Corning Corp. (Auburn, Mich.) under the trade designation, Dow Corning® Low-Adhesion, Low-Migration Silicone PSA.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited unless expressly stated otherwise. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

The terms "sheet" and "film" are often used interchangeably and to refer to essentially planar, i.e., two-dimensional, articles where thickness of the article is much smaller than either the length (L) and/or the width (W) thereof. For example, thickness of the sheet/film may be less than about 10%, 1%, or even $\frac{1}{60,000}^{th}$ of either the length or width of thereof. Sheets and films can be formed as discrete articles with a finite length and width or as a continuous article in, for example, roll form with an essentially infinite length. The term "film" often denotes a product formed using what is commonly known as web handling equipment. Nevertheless, the terms sheet and film are used herein without restriction as to any method of formation or thickness thereof, unless mentioned otherwise.

Further, as used throughout, ranges may be used as shorthand for describing each and every value that is within the range. Any value within the range can be selected as the terminus of the range. Similarly, any discrete value within the range can be selected as the minimum or maximum value recited in describing and claiming features of the invention.

Further, any properties described or measured herein are those existing at room temperature and atmospheric pressure unless specified otherwise.

Various modifications and alterations of the invention will become apparent to those skilled in the art without departing from the spirit and scope of the invention, which is defined by the accompanying claims. It should be noted that, unless otherwise noted, steps recited in any method claims below do not necessarily need to be performed in the order that they are recited. Those of ordinary skill in the art will recognize variations in performing the steps from the order in which they are recited.

Also keep in mind that any theories set forth herein are subject to change pending further testing and analysis. As such, the inventors do not intend to be bound by any theories proffered herein as to, for example, what factors contribute to physical properties described in conjunction with protective sheets and individual layers therein.

The invention claimed is:

1. A protective sheet comprising sequential layers as follows:
   a first polymeric layer;
   a first modifiable interlayer; and
   a second polymeric layer,
wherein the protective sheet is relatively flexible and capable of being shaped into and maintained as a relatively rigid protective sheet having a non-planar form without plastically deforming the first polymeric layer and the second polymeric layer of the sheet, and
wherein, once maintained in the non-planar form and the first modifiable interlayer is modified, the resulting first modified interlayer has a shear storage modulus of greater than about 100 MPa.

2. The protective sheet of claim 1, wherein the protective sheet comprises sequential layers as follows:
   the first polymeric layer;
   the first modifiable interlayer;
   the second polymeric layer;
   a second modifiable interlayer; and
   a third polymeric layer,
wherein a modifiable interlayer is present between each sequential pair of polymeric layers.

3. The protective sheet of claim 2, wherein the protective sheet comprises sequential layers as follows:
   the first polymeric layer;
   the first modifiable interlayer;
   the second polymeric layer;
   the second modifiable interlayer;
   the third polymeric layer;
   a third modifiable interlayer; and
   a fourth polymeric layer.

4. The protective sheet of claim 3, wherein the protective sheet comprises sequential layers as follows:
   the first polymeric layer;
   the first modifiable interlayer;
   the second polymeric layer;
   the second modifiable interlayer;
   the third polymeric layer;
   the third modifiable interlayer;
   the fourth polymeric layer; and
   a fifth polymeric layer.

5. The protective sheet of claim 2, wherein each modifiable interlayer is based on the same material.

6. The protective sheet of claim 2, wherein at least one polymeric layer is sandwiched between chemically distinct modifiable interlayers.

7. The protective sheet of claim 1, wherein a planar monolithic film having an equivalent thickness to that of the protective sheet of claim 1 and formed of the same material as used for the first polymeric layer and the second polymeric layer comparatively requires plastic deformation in order to take the shape of and maintain the non-planar form.

8. The protective sheet of claim 1, wherein the first modifiable interlayer is formable.

9. The protective sheet of claim 1, wherein the first modifiable interlayer is viscoelastic.

10. The protective sheet of claim 1, wherein the first modifiable interlayer is reversibly modifiable.

11. The protective sheet of claim 1, wherein the first modifiable interlayer is irreversibly modifiable.

12. The protective sheet of claim 1, wherein the first modifiable interlayer is chemically modifiable.

13. The protective sheet of claim 1, wherein each of the first polymeric layer and the second polymeric layer is based on a material selected from polymethylmethacrylate (PMMA), polyethylene terephthalate (PET), and polycarbonate chemistries.

14. The protective sheet of claim 1, wherein the protective sheet has a thickness of up to about 2.5 millimeters.

15. The protective sheet of claim 1, wherein the protective sheet has a total thickness of about 0.15 millimeter to about 0.6 millimeter.

16. The protective sheet of claim 1, wherein shear storage modulus of the first modifiable interlayer is lower relative to shear storage modulus of that same interlayer after it is shaped into the non-planar form.

17. The protective sheet of claim 1, wherein the first modified interlayer has a shear storage modulus that is at least two times as high as the shear storage modulus of the interlayer as it is shaped into the non-planar form.

18. The protective sheet of claim 1, wherein the first modified interlayer has a shear storage modulus that is at least five times as high as the shear storage modulus of the interlayer as it is shaped into the non-planar form.

19. The protective sheet of claim 1, wherein the first modified interlayer has a shear storage modulus that is at least ten times as high as the shear storage modulus of the interlayer as it is shaped into the non-planar form.

20. The protective sheet of claim 1, wherein the first modified interlayer has a shear storage modulus that is at least one-hundred times as high as the shear storage modulus of the interlayer as it is shaped into the non-planar form.

21. The protective sheet of claim 1, wherein the first modified interlayer has a shear storage modulus that is at least one-thousand times as high as the shear storage modulus of the interlayer as it is shaped into the non-planar form.

22. The protective sheet of claim 1, wherein the first modified interlayer has a tan delta of less than about 0.5.

23. The protective sheet of claim 1, wherein the first modifiable interlayer has a shear storage modulus of less than about 100 MPa when shaping the protective shape into the non-planar shape.

24. The protective sheet of claim 1, wherein the first modifiable interlayer has a tan delta of greater than about 0.5 when shaping the protective shape into the non-planar shape.

25. The protective sheet of claim 1, further comprising an outwardly exposed layer of self-wetting material.

26. The protective sheet of claim 25, wherein the self-wetting material comprises a pressure-sensitive adhesive.

27. An electronic article comprising:
   an electronic device comprising an optical display screen; and the relatively rigid protective sheet of claim 1 outwardly exposed adjacent to and protecting the optical display screen.

28. The electronic article of claim 27, wherein coefficient-of-friction of the outwardly exposed surface of the relatively rigid protective sheet is less than about 0.40 when tested according to ASTM D1894.

29. The electronic article of claim 27, wherein coefficient-of-friction of the outwardly exposed surface of the relatively rigid protective sheet is less than about 0.35 when tested according to ASTM D1894.

30. The electronic article of claim 27, wherein coefficient-of-friction of the outwardly exposed surface of the relatively rigid protective sheet is no more than about 25% greater than coefficient-of-friction of the optical display screen.

31. The electronic article of claim 27, wherein coefficient-of-friction of the outwardly exposed surface of the relatively rigid protective sheet is no more than about 20% greater than coefficient-of-friction of the optical display screen.

32. The electronic article of claim 27, wherein coefficient-of-friction of the outwardly exposed surface of the relatively rigid protective sheet is no more than about 15% greater than coefficient-of-friction of the optical display screen.

33. The electronic article of claim 27, wherein coefficient-of-friction of the outwardly exposed surface of the relatively rigid protective sheet is less than coefficient-of-friction of the optical display screen.

34. The electronic article of claim 27, wherein the outwardly exposed surface of the relatively rigid protective sheet comprises a material nanomodified with sapphire.

35. A method of applying the protective sheet of claim 1 to a display surface on an electronic device, the method comprising steps of:
   optionally, if necessary, modifying the first modifiable interlayer so that it becomes a formable interlayer;
   forming the protective sheet comprising the interlayer into a desired non-planar shape;
   while in the desired non-planar shape, converting the multi-layer protective sheet into a relatively rigid protective sheet comprising the first modified interlayer;
   if necessary, sizing the relatively rigid protective sheet to cover at least the display surface of the electronic device; and
   applying the sized relatively rigid protective sheet to the electronic device so that it covers at least the display surface.

36. The method of claim 35, wherein the display surface is non-planar.

37. The method of claim 35, wherein the modifiable interlayer is chemically modified via a mechanism selected from: ultraviolet (UV) irradiation, thermal irradiation, step growth polymerization, 1K thermoset reaction relying on latent curatives, 2K or 2-part thermoset reaction relying on active curatives, and B-stage epoxy reaction.

38. The method of claim 35, further comprising at least one of the following steps:
   packaging the protective sheet;
   storing the protective sheet; and
   shipping the protective sheet,
wherein the at least one additional step is performed while curing the protective sheet into the relatively rigid protective sheet.

39. The method of claim 38, wherein the at least one additional step is performed while using at least one tool to assist in maintaining the non-planar form.

40. The method of claim 39, wherein the at least one tool comprises a part of product packaging for the protective sheet.

* * * * *